United States Patent [19]

Takemoto et al.

[11] Patent Number: 5,551,912
[45] Date of Patent: Sep. 3, 1996

[54] COIN CONVEYING APPARATUS

[75] Inventors: Takatoshi Takemoto; Tosikazu Chida, both of Tokyo; Noriaki Kano, Hanamaki; Eizi Ito, Hanamaki; Koji Murakami, Hanamaki; Takasi Itagaki, Hanamaki; Kozo Sekimoto, Sendai; Masanori Suzuki, Hanamaki, all of Japan

[73] Assignee: Kagushiki Kaisha Ace Denken, Japan

[21] Appl. No.: 297,509

[22] Filed: Aug. 29, 1994

[51] Int. Cl.⁶ .................... G07D 1/00; B65G 47/56
[52] U.S. Cl. .................... 453/56; 198/560; 193/DIG. 1
[58] Field of Search .................... 194/344, 353, 194/342, 343; 453/56, 63, 7, 11, 55, 62; 193/DIG. 1; 198/453, 456, 560

[56] References Cited

U.S. PATENT DOCUMENTS

| | | | |
|---|---|---|---|
| 2,179,798 | 11/1939 | Petskeyes | 198/560 X |
| 2,672,219 | 3/1954 | Skillman | 198/560 X |
| 3,486,511 | 12/1969 | Salvesen | 453/56 X |
| 4,949,532 | 8/1990 | Fujimagari et al. | 453/56 X |
| 5,355,988 | 10/1994 | Shirasawa | 453/56 X |

FOREIGN PATENT DOCUMENTS

| | | | |
|---|---|---|---|
| 59-188476 | 5/1983 | Japan . | |
| 6-187541 | 7/1994 | Japan . | |
| 6-218134 | 8/1994 | Japan | 453/56 |

*Primary Examiner*—Karen B. Merritt
*Assistant Examiner*—Scott L. Lowe
*Attorney, Agent, or Firm*—Andrus, Sceales, Starke & Sawall

[57] ABSTRACT

The ending side of one coin conveying endless belt is made higher than the starting side of another adjacent coin conveying endless belt. Between the ending side of the one coin conveying belt and the starting side of the another coin conveying belt, there is provided a coin slide to let the coins, which have reached the ending side of the one coin conveying belt, slide down to the starting side of the another coin conveying belt. By using the coin slide, the transference of coins from the one coin conveying belt to the another coin conveying belt can be ensured.

8 Claims, 12 Drawing Sheets

COIN CONVEYING APPARATUS

BACKGROUND OF THE INVENTION

This invention relates to a coin conveying apparatus, and more particularly to a coin conveying apparatus suitably usable, for example, in a game machine island such as a pachinko game machine island in a game parlor.

DESCRIPTION OF THE RELATED ART

A coin conveying apparatus is provided, for example, in a game machine island such as a pachinko machine island. A pachinko machine island comprises many pachinko machines, many ball lending machines, island decorations, etc. Within a pachinko machine island, the pachinko machines and the ball lending machines are arranged alternately in a line to form a row of pachinko machines. The island decorations are provided at both ends of the row of pachinko machines. Within the island decoration, a stacker is provided, which stores coins accepted by the ball lending machine for dispensing pachinko balls. The coin conveying apparatus is provided straightly along the back of the row of the pachinko machines to convey the coins collected from each of the pachinko machines to the stacker in the island decoration. Usually, two pachinko machines and two ball lending machines compose one unit in the pachinko island. The coin conveying apparatus includes one coin conveying device for one unit.

The coin conveying device comprises a drive pulley and a driven pulley which respectively have a shaft extending horizontally, and an endless belt put over the respective pulley so that an outer periphery of the belt provides a flat surface.

Conventionally, in the coin conveying apparatus, each coin conveying device is provided to have a belt arranged in a straight line and to have a horizontal flat surface of the belt.

However, in this kind of conventional coin conveying apparatus, there is such a problem that it is difficult to transfer coins without fail from one coin conveying device to another coin conveying device adjacent to it. Since the pulley is cylindrical, the space between where the belt of one coin conveying device is wound around the pulley and the belt of another coin conveying device is wound around the pulley is a notch, and the coins may be stuck therein.

SUMMARY OF THE INVENTION

In view of the problems as mentioned above, the object of the present invention is to provide a coin conveying apparatus which can reliably transfer coins from one coin conveying belt to another coin conveying belt.

For attaining the above object, the coin conveying apparatus comprises a plurality of conveying units including an endless belt having a flat peripheral surface, a drive pulley and a driven pulley over which the endless belt is placed, a shaft of each pulley, a pulley driving mechanism to rotate the shaft of the drive pulley, and a conveying base which mounts these wherein:

the shaft of the driven pulley is rotatably fixed to the conveying base to extend in parallel to a horizontal direction;

the shaft of the drive pulley is rotatably fixed to the conveying base to extend in parallel to a horizontal direction, at a higher position than the shaft of the driven pulley to allow the endless belt to ascend gradually from the driven pulley side to the drive pulley side;

the pulley driving mechanism rotates the shaft of the drive pulley so that a portion of the endless belt positioned at an upper side (hereinafter termed coin placing section) approaches the drive pulley from the driven pulley; and the plurality of conveying units are arranged next to each other so that the drive pulley of one conveying unit is adjacent to the driven pulley of another conveying unit.

The coin conveying unit also comprises a coin slide which slides coins that have reached an end section of the drive pulley of the coin conveying endless belt of the one conveying unit by being conveyed on the coin placing section of the endless belt of a conveying unit.

In general, when conveying a certain object by a plurality of endless belts arranged in a line, the plurality of conveying belts are arranged on the same line. However, as mentioned before, when conveying something comparatively small, such as coins, the coins or the like may be stuck at the border point of one endless belt and the adjacent endless belt. Therefore, the present invention increases the certainty of transferring coins between the endless belt by slanting the endless belt and providing a coin slide between an ending side of the endless belt of one conveying unit and a starting side of the endless belt of another adjacent conveying unit.

An object of the present invention will be explained concretely below.

In the present invention, as a result of slanting the endless belt, the ending side of the endless belt of one conveying unit becomes higher in position than the starting side of the endless belt of another conveying unit adjacent to one conveying unit. By providing a coin slide between the endless belt of one conveying unit and the endless belt of another conveying unit adjacent to this conveying unit, the coins which have reached the ending side of the endless belt of one conveying unit slide down to the starting side of the endless belt of another conveying unit. Thus, the transference of coins between the endless belts can be ensured.

It is preferable for the coin slide to comprise a widthwise direction guide member which introduces the coins toward the center of the widthwise direction of the endless belt of the another conveying unit as the coins slide down from the endless belt of one conveying unit to the endless belt of another conveying unit adjacent to it, among the plurality of conveying units. Accordingly, by providing the widthwise direction guide, the coins which have slid down the slide will be placed at the center of the widthwise direction of the endless belt, and the transference of the coins between the endless belts will be more accurate.

Further, it is preferable to have the conveying unit provided with a belt supporting member which supports the coin placing section of the endless belt from the bottom between the driven pulley and the drive pulley. It is preferable for the belt supporting member to comprise a supporting board which supports the coin placing section of the endless belt by coming into contact with the bottom surface thereof and side boards which restrict the position of the widthwise direction on the endless belt of the coin placed on the coin placing section, by being positioned at both ends of the endless belt in the widthwise direction of the endless belt.

Furthermore, the driven pulley and the drive pulley are preferably formed so as to be cylindrical having each of the shafts at the center with a plurality of teeth formed at the peripheral surface and the inner surface of the endless belt is preferably formed with ribs to fit the teeth of the drive pulley and the driven pulley. By forming pulleys and endless

PREFERRED EMBODIMENTS OF THE INVENTION

An embodiment of the present invention will be explained below, with reference to the figures.

Figure 11:
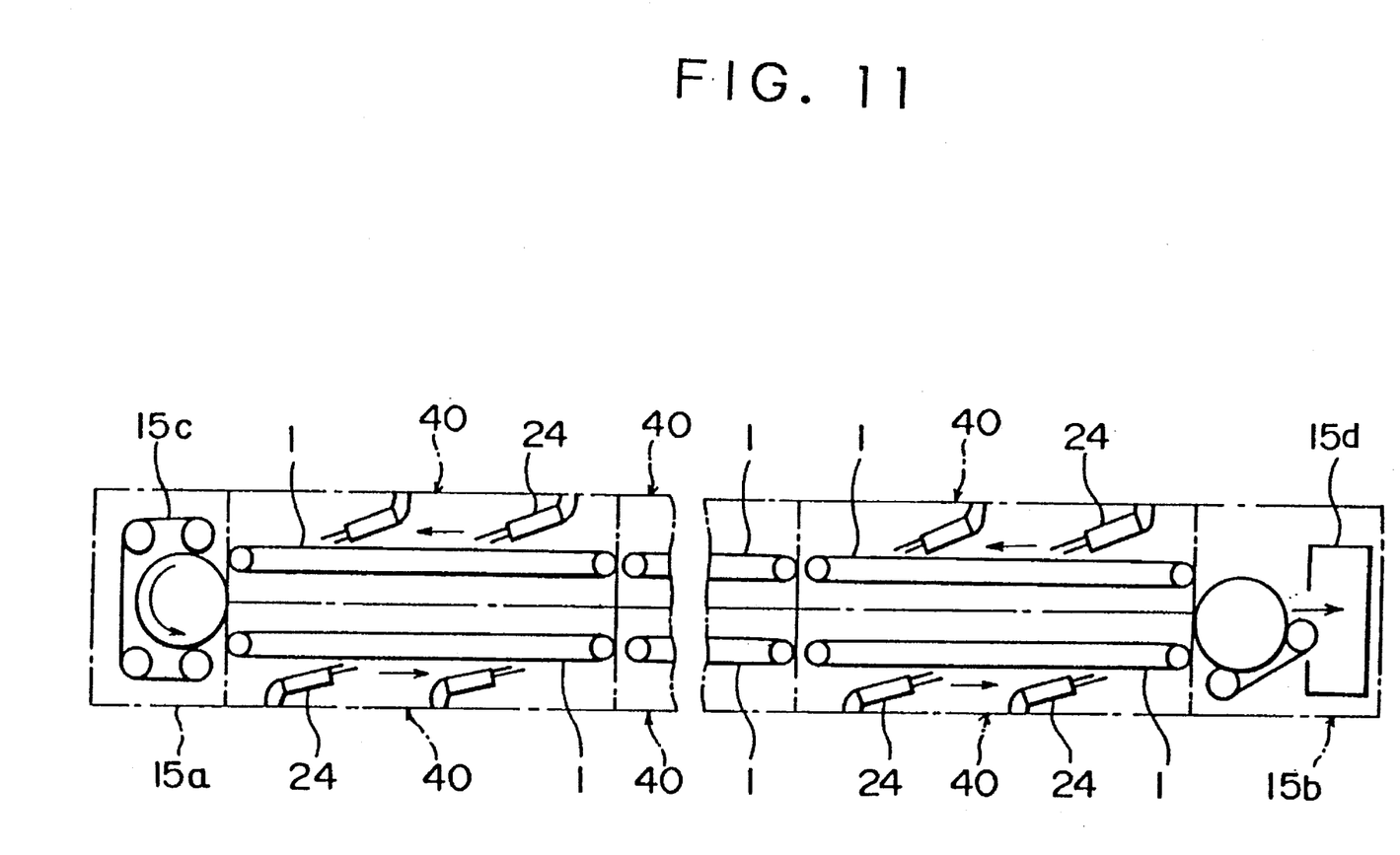
FIG. 11 is an explanatory view of a pachinko island which shows the way of arrangement of the conveying unit, the island decorations, etc., according to the embodiment of the present invention.
Figure 13:
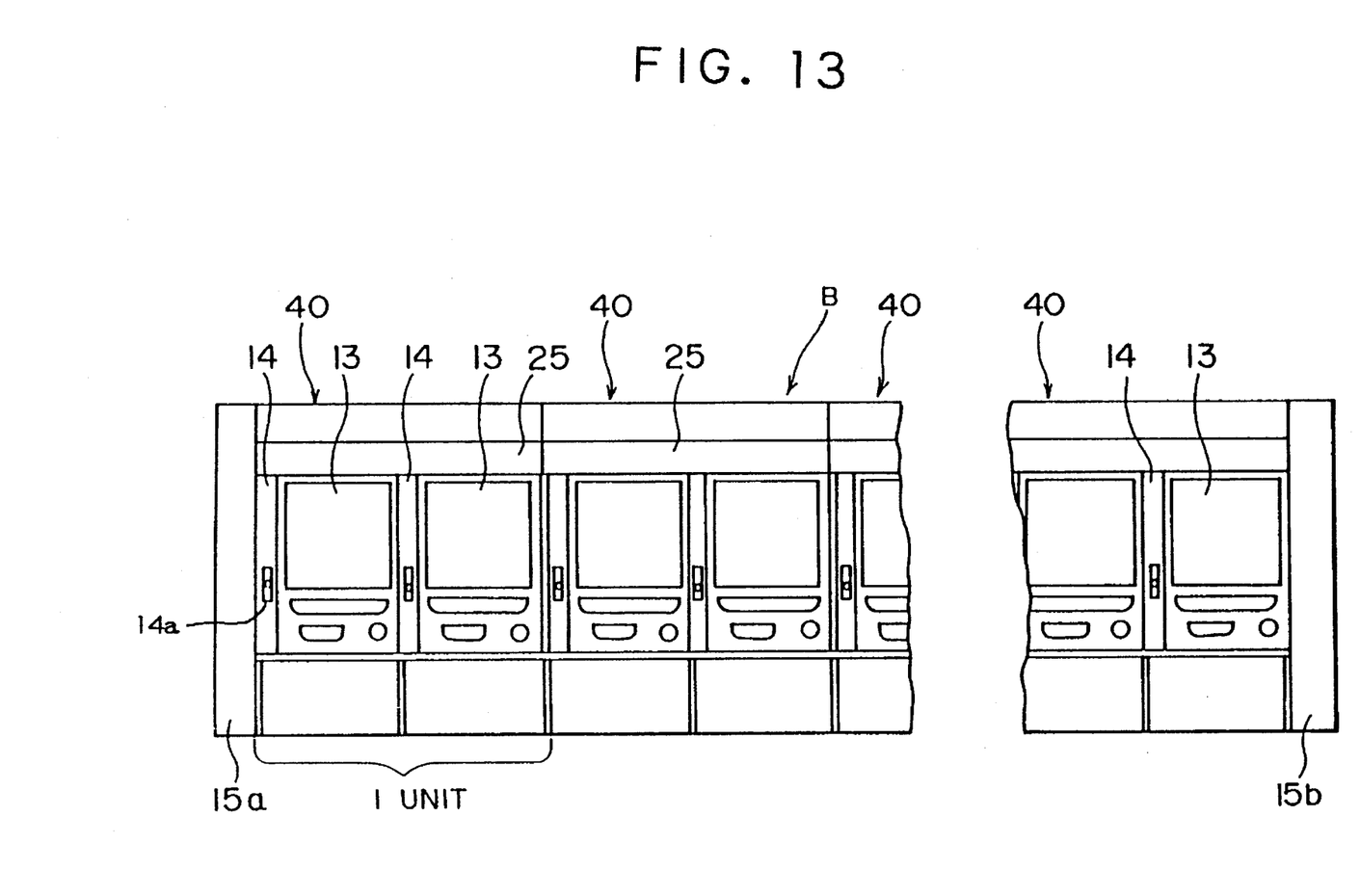
FIG. 13 is a front view of a pachinko island employing the embodiment of the present invention.

As shown in FIG. 13, a pachinko island B comprises a number of pachinko machines 13, a number of ball lending machines 14, and island decorations 15a, 15b, etc. The pachinko machines 13 and the ball lending machines 14 are arranged alternately in a line. In a single pachinko island B, two rows of pachinko machines are arranged back to back with each other in parallel. At both ends of the line of two rows of pachinko machines, the island decorations 15a, 15b are provided, respectively. In this ball lending island B, two pachinko machines 13 and two ball lending machines 14 construct one unit. On the top of the row of pachinko machines, a conveying unit 40 comprising a bank note conveying device, a bank note distinction device, a coin conveying device, a coin distinction device, etc, are provided. Thus, a plurality of conveying units 40 provided on the top of the row of pachinko machines are arranged to be adjacent to each other in two straight rows, as shown in FIG. 11.

Within the island decoration 15b provided at one of the two ends of the pachinko island B, a moneychanger 15d etc. is provided. In this moneychanger 15d, stackers for storing both the bank notes sent from the bank note conveying device and the coins sent from the coin conveying device, both constituent parts of the conveying unit 40 are provided. Further, within the island decoration 15a provided at the other end of the pachinko island B, there is a turning device 15c which transmits the bank notes and the coins from the conveying unit at one end of one row of pachinko machines to the conveying unit 40 at the other end of said one row of pachinko machines.

Figure 12:
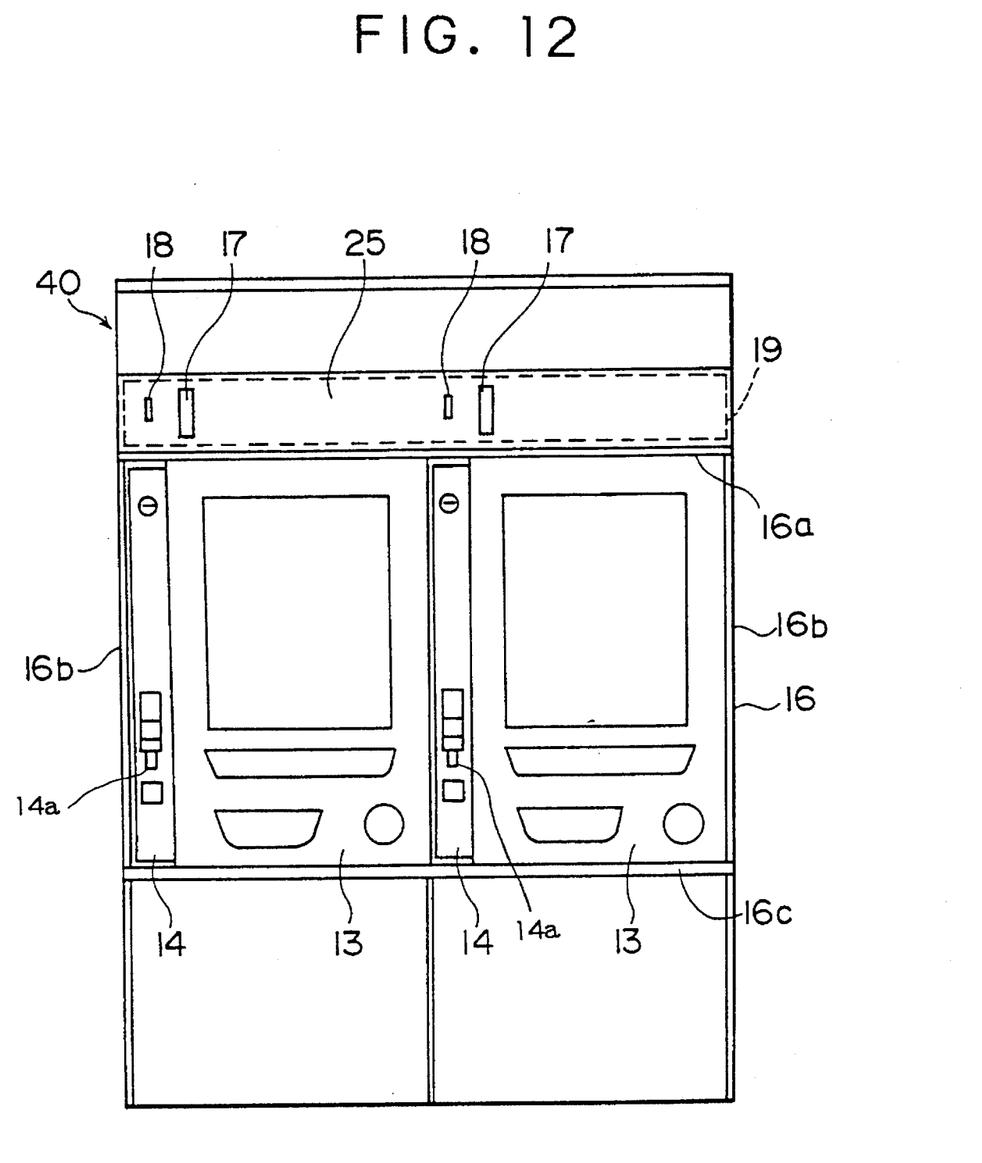
FIG. 12 is a front view of one unit of pachinko machines, ball lending machines, etc., according to the embodiment of the present invention.

The pachinko machines 13, 13 and the ball lending machines 14, 14 which comprise one unit are housed within a rectangular unit supporting frame 16. The unit supporting frame 16 comprises a top board 16a, side boards 16b, 16b and a waist board 16c. A conveying base 19 of the conveying unit 40 is fixed on the top board 16a of the unit supporting frame 16. At the front of the base 19, a front covering board 25 is provided. On the front covering board 25, bank note insertion slots 17 and coin insertion slots 18 are formed.

Figure 1:
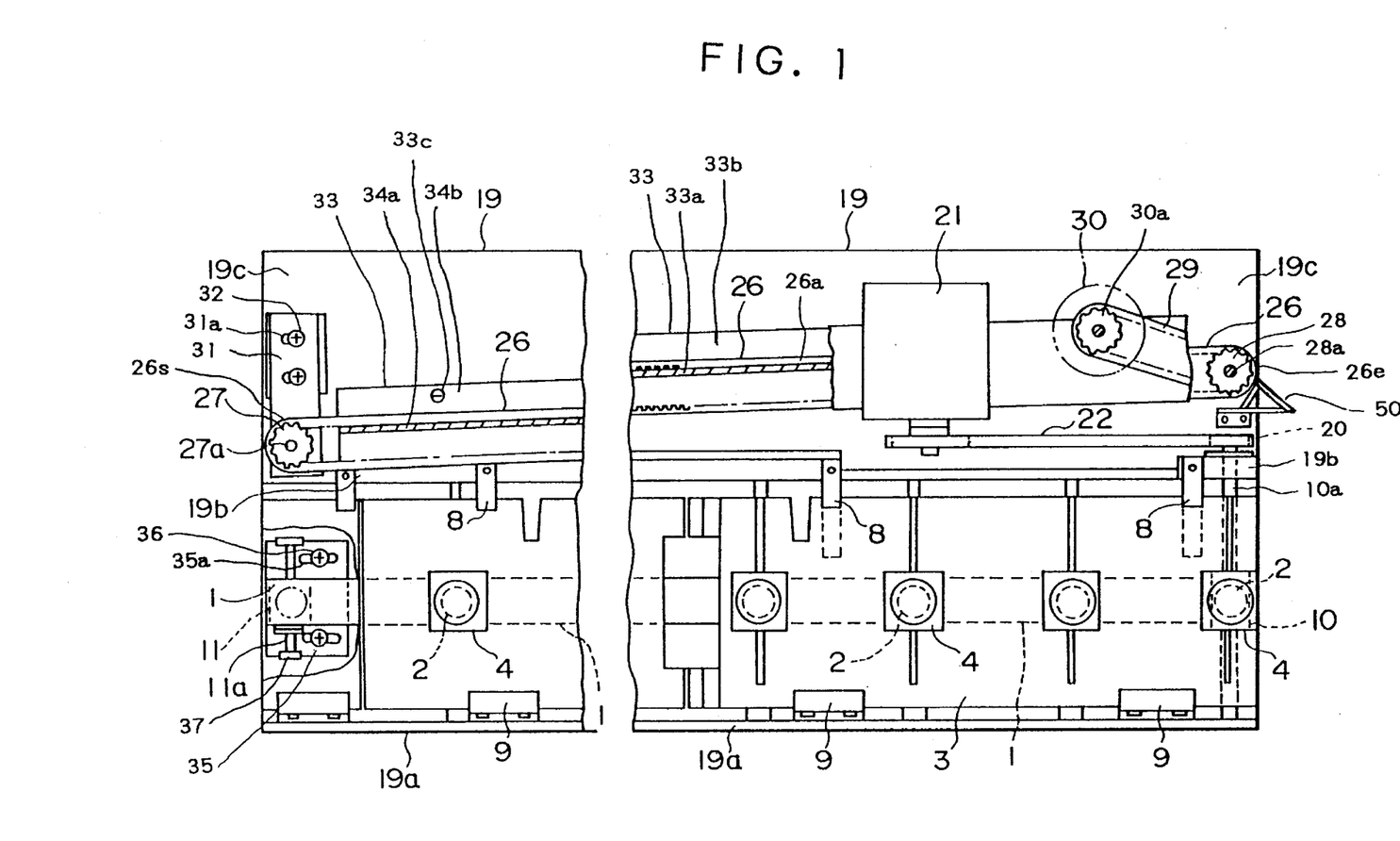
FIG. 1 is a front view of a conveying unit in an embodiment of the present invention.
Figure 2:
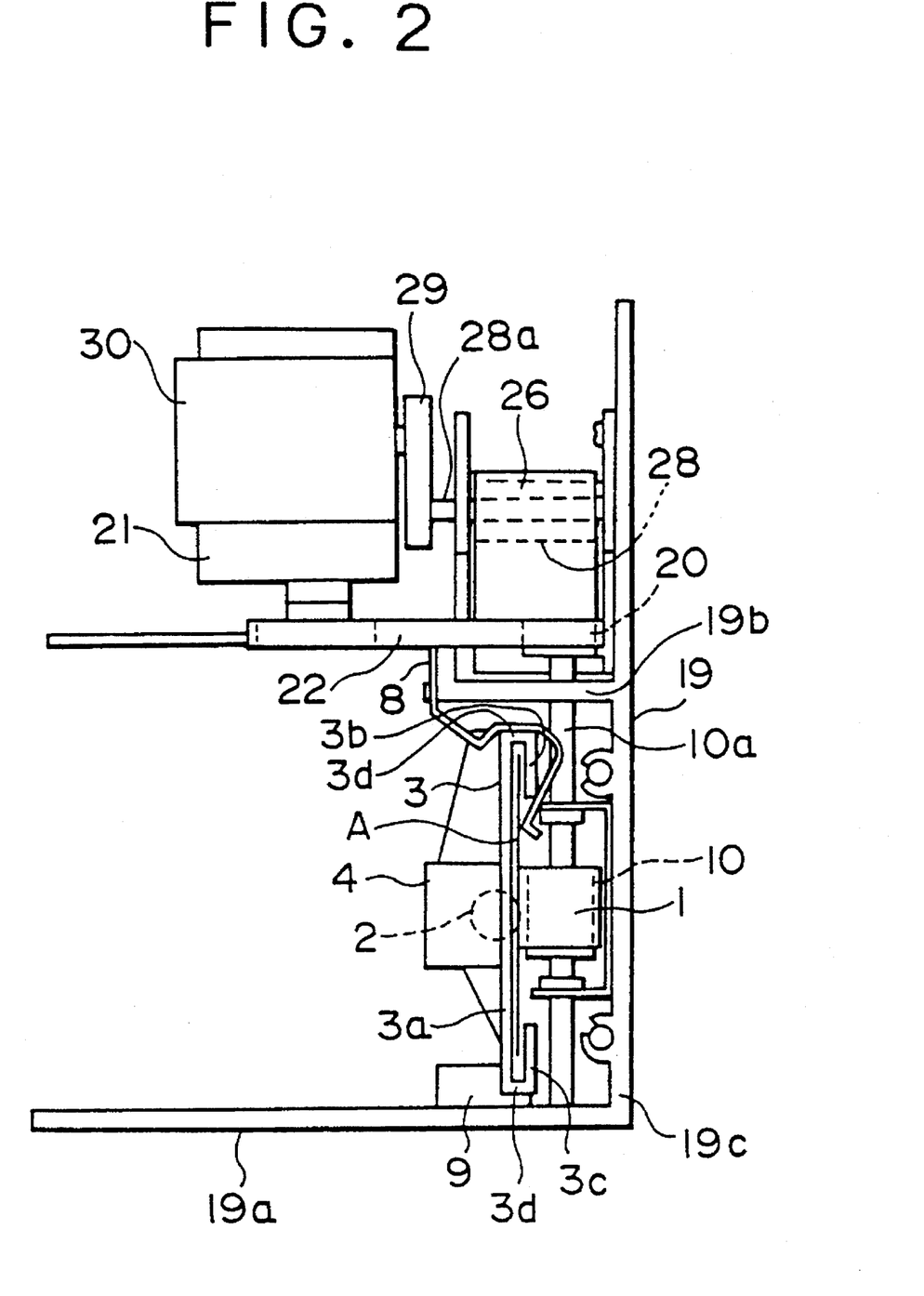
FIG. 2 is a side view of the conveying unit in the embodiment of the present invention.

The base 19, as shown in FIG. 1 and FIG. 2, comprises a base board 19a connected to the upper board 16a of the unit supporting frame 16, an upright board 19c perpendicularly standing at the inner end of the base board 19a, and a shelf board 19b provided parallel to the base board 19a at the middle portion in the lengthwise direction of the upright board 19c.

The coin conveying device is provided at the upper side of the shelf board 19b of the base 19. The coin conveying device comprises a coin conveying endless belt 26, a drive pulley 28 and a driven pulley 27, over which the coin conveying belt is placed, a shaft 28a of the pulley 28, a shaft 27a of the pulley 27, a belt supporting member 33 which supports the endless belt 26 between the drive pulley 28 and the driven pulley, a coin conveying motor 30 which rotates the shaft 28a of the drive pulley 28, and a transmitting belt 29 which connects a shaft of the coin conveying motor 30 and the shaft 28a of the drive pulley 28.

Figure 7:
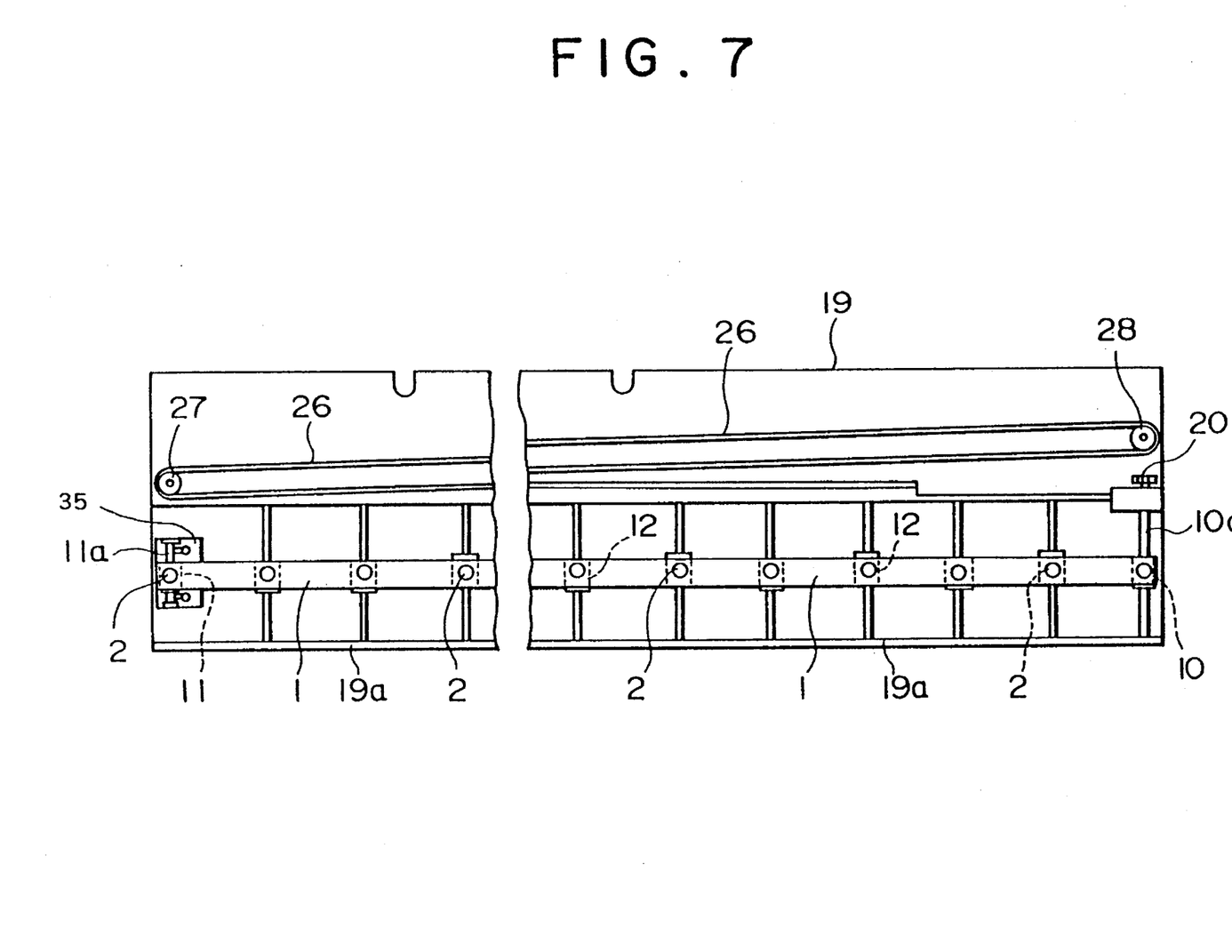
FIG. 7 is a front view of the conveying unit, with a driving mechanism of each belt and a bank note conveying path forming member omitted.

The shaft 28a of the drive pulley is fixed at one end of the upright board 19c via a bearing (not shown) so that it is perpendicular to the upright board 19c and at the same time horizontal. On the other hand, the shaft 27a of the driven pulley is fixed to the other end of the upright board 19c via a bearing (not shown) and a bearing fixing board so that it is perpendicular to the upright board 19c and at the same time horizontal. However, the shaft 27a of the driven pulley is provided at a lower level than the shaft 28a of the drive pulley. Thus, the coin conveying endless belt 26 slants downwards from the drive pulley 28 side to the driven pulley 27 side as shown in FIG. 7. The bearing fixing board 31, at which the bearing of the shaft 27a of the driven pulley is fixed, is fixed to the upright board 19c by the screws 32 inserted into the elongated holes 31a which are formed to be elongated in the direction in which the coin conveying endless belt 26 extends. Thus, the bearing fixing board 31, the bearing, the shaft 27a of the driven pulley, and the driven pulley 27 can be moved in the direction in which the coin conveying endless belt 26 extends.

The drive pulley 28 and the driven pulley 27 are both cylindrical, and on their periphery, a plurality of teeth are formed. The outer surface of the coin conveying belt 26 is formed to be smooth while the inner surface is formed with ribs to fit the teeth of the drive pulley 28 and the driven pulley 27. As can be seen in FIG. 1, coins are put on the flat outer surface (in this case the surface facing upward) of a section of the coin conveying endless belt 26a (hereinafter termed coin placing section) which moves from the driven pulley 27 side to the drive pulley 28 side.

Figure 4:
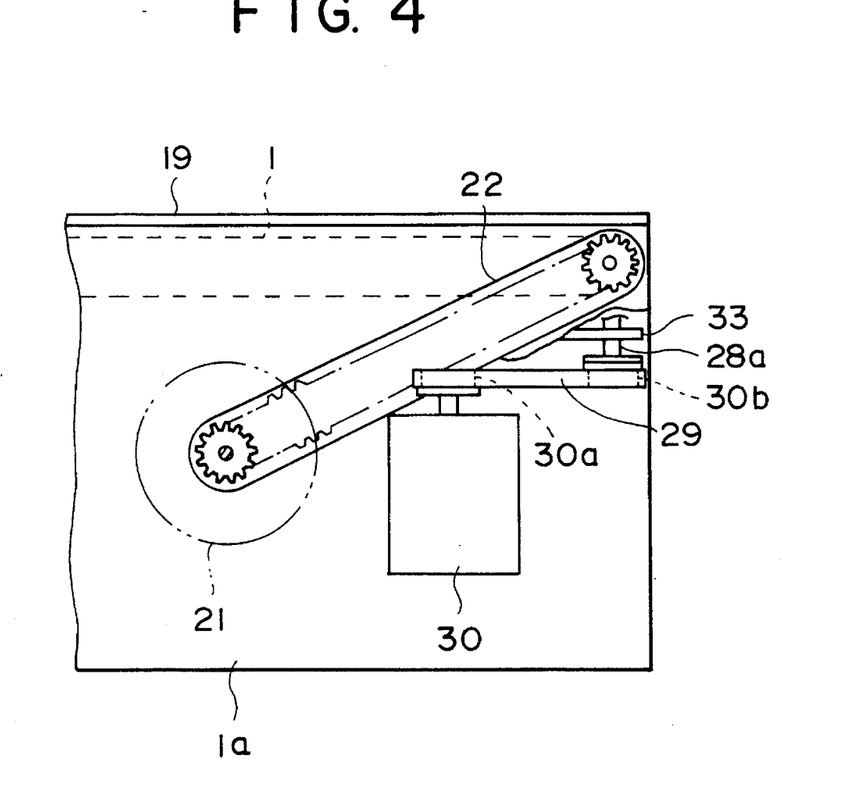
FIG. 4 is a top plan view of the main portion of the conveying unit in the embodiment of the present invention.
Figure 5:
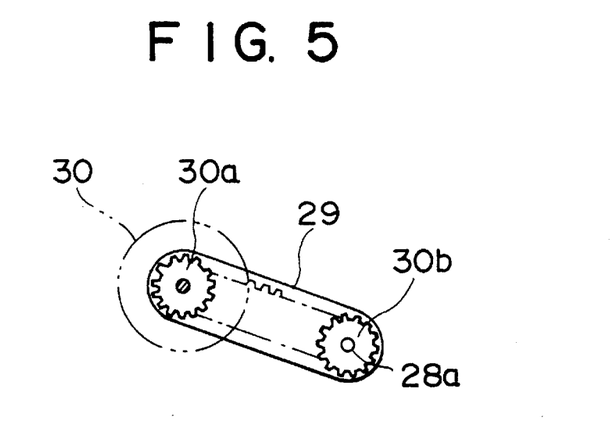
FIG. 5 is a front view of a transmitting belt for coin conveyance in the embodiment of the present invention.

As shown in FIG. 4 and FIG. 5, to the shaft of the coin conveying motor 30, a drive pulley 30a of the transmitting belt is provided, and to the shaft 28a of the drive pulley, a driven pulley 30b of the transmitting belt is provided. The transmitting belt 29 is placed over these pulleys 30a, 30b. On the periphery of the pulleys 30a 30b, a plurality of teeth are formed. On the other hand, the inner surface of the transmitting belt 29 is formed with ribs to fit the teeth of the pulleys 30a, 30b.

Figure 3:
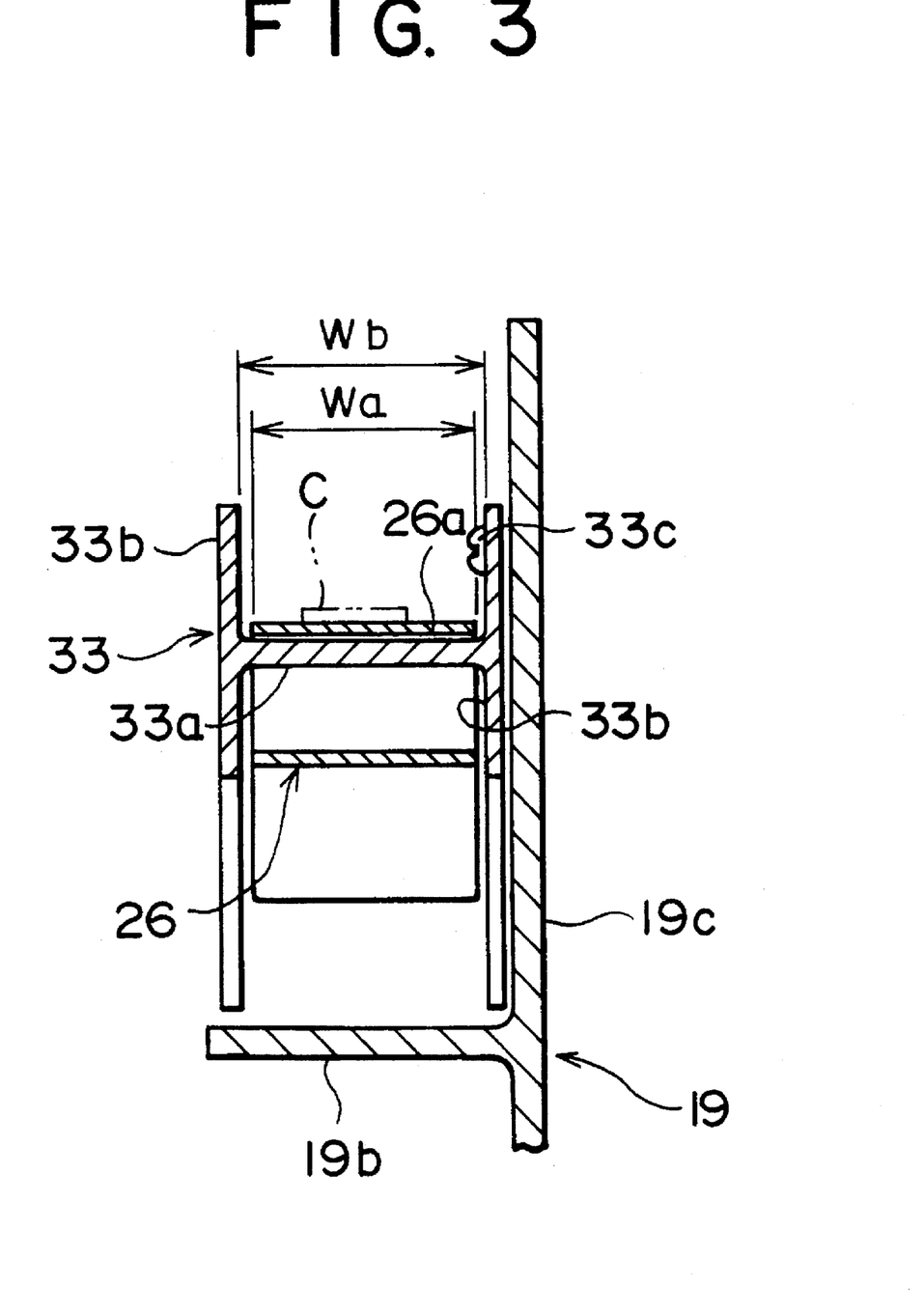
FIG. 3 is a cross sectional view of a coin conveying endless belt and a belt supporting member in the embodiment of the present invention.

The belt supporting member 33, as shown in FIG. 3, is what is called H sections comprising two side boards 33b, 33b parallel to each other and a supporting board 33a formed therebetween. The distance between the two side boards 33b, 33b, that is width Wb of the supporting board 33a, is slightly larger than the width Wa of the coin conveying endless belt 26. The belt supporting member 35 is provided to have the side boards 33b, 33b parallel in the vertical direction, and the supporting board 33a in a condition slanting downward from the drive pulley 28 side to the driven pulley 27 side, so that the coin placing section 26a of the coin conveying endless belt can be supported from the bottom by the supporting board 33a of the supporting member 33. The belt supporting member 33 is fixed to the conveying base 19 by having its side board 33b fixed to the upright board 19c of the conveying base 19 by the screw 33c.

The aforementioned coin distinction device not shown in the figures is an apparatus for distinguishing whether coins C inserted from the coin insertion slots 18 are real, counterfeit, etc., to convey only the coins C distinguished to be real onto the coin placing section 26a of the coin conveying endless belt 26 and to instruct the ball lending machine 14 to dispense the number of pachinko balls corresponding to the amount of the inserted coins c.

The bank note conveying device, as shown in FIG. 1 and FIG. 2, is provided between the base board 19a and the shelf board 19b of the conveying base 19. The bank note conveying device is for conveying the bank note A with the face of the bank note A extending substantially in parallel to a vertical direction and with the length of the bank note A extending substantially in parallel to a horizontal direction. The bank note conveying device is provided so as to be in parallel to the direction in which the row of pachinko machines extends, similar to a bank note conveying path forming member 3, and comprises a bank note conveying endless belt 1 which comes into contact with one of the two faces of the bank note A, balls 2 which come into contact with the other face of the bank note A and presses the bank note A toward the bank note conveying belt 1, holders 4 which each support a ball 2 so that it can rotate freely, belt supporting pulleys 12 (shown in FIG. 6) provided at the positions opposite the balls 2, sandwiching the bank note conveying belt 1 therebetween, and a belt driving mechanism which rotates the bank note conveying belt 1.

The belt conveying mechanism comprises a drive pulley 10 and a driven pulley 11 over which the bank note conveying belt 1 is placed; shafts 10a, 11a of the pulleys 10, 11; a bank note conveying motor 21 which rotates the shaft 10a of the drive pulley 10; and a transmitting belt 22 which joins the shaft of the bank note conveying motor 21 and the shaft 10a of the drive pulley 10. Among these constituent parts of the bank note conveying device, the bank note conveying motor 21 and the transmitting belt 22 are provided at the upper side of the shelf board 19b of the conveying base 19. The shaft 10a of the drive pulley is provided via the bearing (not shown) at one end portion of the upright board 19c so that it will extend vertically. The shaft 11a of the driven pulley is provided via a bearing 37 and a bearing fixing board 35 at another end portion of the upright board 19c so that it will extend vertically. The bearing fixing board 35 is fixed to the upright board 19c by screws 36 inserted into elongated holes 35a which are formed to be elongated in the direction at which the bank note conveying endless belt 1 extends. Thus, the bearing fixing board 35, the bearing 37, the shaft 11a of the driven pulley, and the driven pulley 11 can be moved to the direction where the bank note conveying endless belt 1 extends. A plurality of teeth are formed at the peripheries of each of the pulleys 10, 11, 12. The outer surface (which the bank notes A come into contact with) of the bank note conveying belt 1 is formed so as to be smooth while the inner surface is formed to have ribs to fit the teeth of the pulleys 10, 11, 12.

The bank note conveying path forming member 3, as shown in FIG. 2, comprises a front side guide section 3a which comes into contact with one of the two faces of the bank note A, an upper rear side guide section 3b which is to be in contact with an upper portion of the other face of the bank note A, a lower rear side guide section 3c which comes into contact with a lower portion of the other face of the bank note A, and widthwise-position guide sections 3d, 3d which control the position of the up/down direction of the bank note A, i.e. the position of the widthwise direction of the bank note A. In the present embodiment, as the bank note A is conveyed in the condition where its face is parallel to the vertical direction, the front side guide section 3a and the rear side guide sections 3b, 3c extend in the vertical direction. The bank note conveying belt 1 is positioned to face the front, side guide section 3a and between the upper rear side guide section 3b, and the lower rear side guide section 3c. At the central portion of the front side guide section 3a, a circular opening (not shown) is formed. The opening has a smaller diameter than the ball 2 so that while a portion of the ball 2 can project out therethrough, the ball 2 will not completely come out of it. At the front of the front side guide section 3a, i.e. the opposite face of the bank note conveying belt 1, a holder 4 which supports the ball 2 to be freely rotatable is provided.

The bank note conveying path forming member 3 has its top part supported by the leaf spring 8 and its bottom part supported by a path forming member fastener 9. One end of the leaf spring 8 is fixed to the shelf board 19b of the conveying base 19 while the opposite end is formed in a shape to be engageable with the top part of the bank note conveying path forming member 3. The bank note conveying path forming member 3 is supported by the leaf spring 8 and the path forming member fastener 9 so that it may be displaced between a conveyable position where the front side guide section 3a faces against the bank note conveying belt 1 and a repairable portion where the upper side of the bank note conveying path forming member 3 swings about the lower side to fall to the front.

Figure 6:
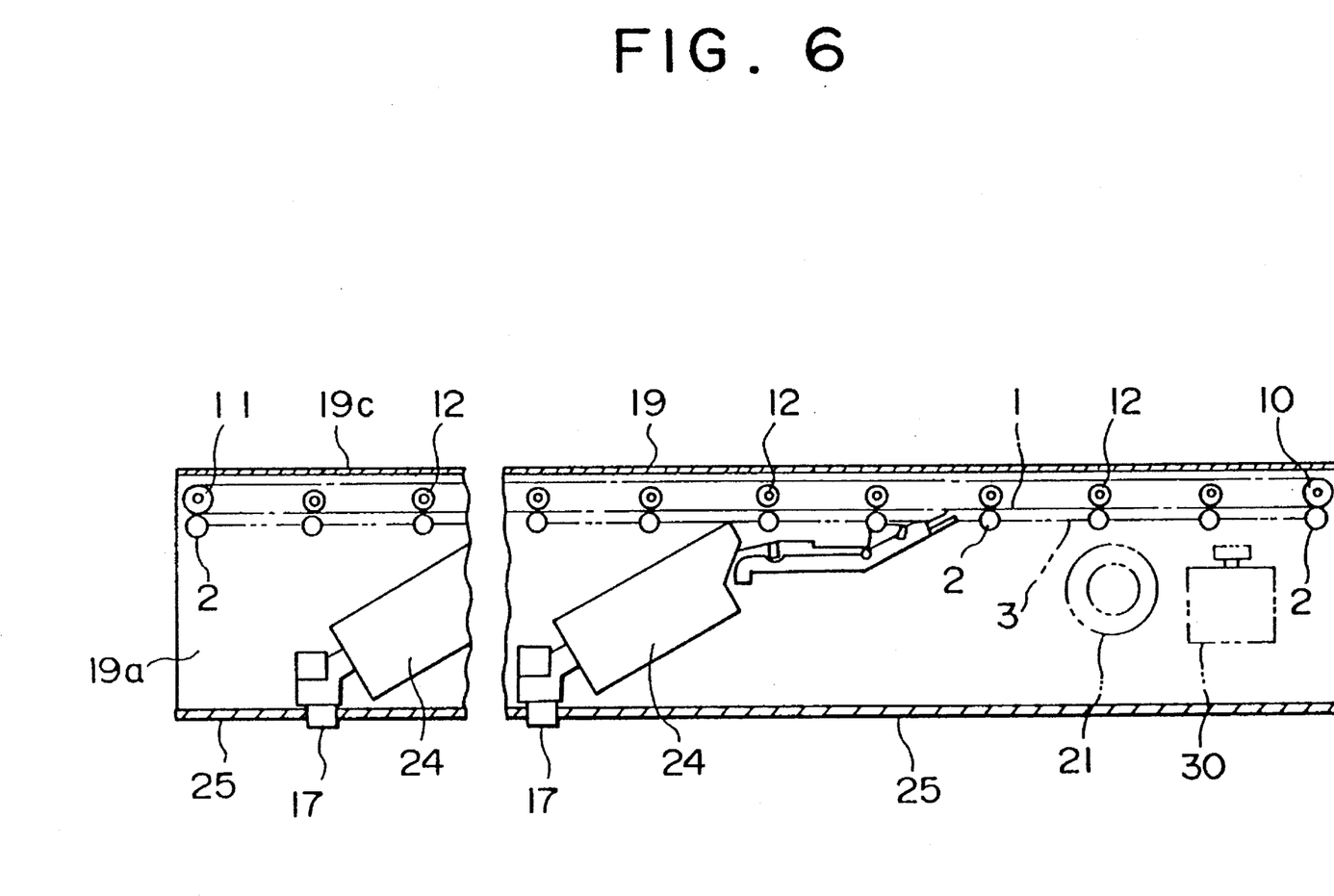
FIG. 6 is a top plan view of the conveying unit in the embodiment of the present invention, with a coin conveying apparatus and a bank note conveying path forming member omitted.

The bank note distinction device 24, as shown in FIG. 6, determines whether the bank notes A inserted from the bank note insertion slots 17 provided on the front covering board 25 are, real, counterfeit, etc., and only the bank notes A determined to be real are conveyed in between the bank note conveying belt 1 and the balls 2. It also instructs the ball lending machine 14 to dispense the number of pachinko balls corresponding to the amount of the inserted bank notes A.

Figure 8:
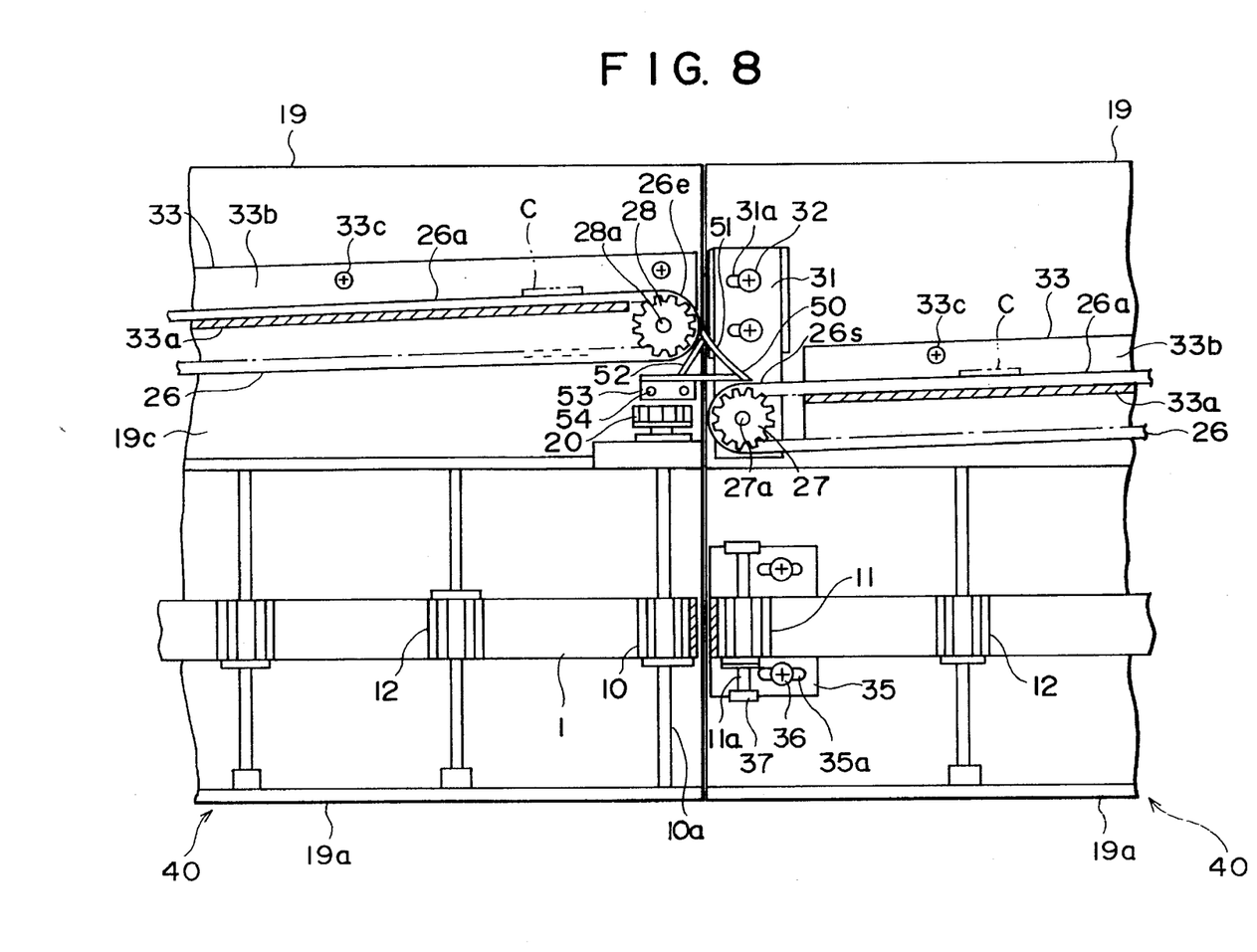
FIG. 8 is a front view of a portion between the conveying units according to,the embodiment of the present invention, with a driving mechanism of each belt and a bank note conveying path forming member omitted.
Figure 9:
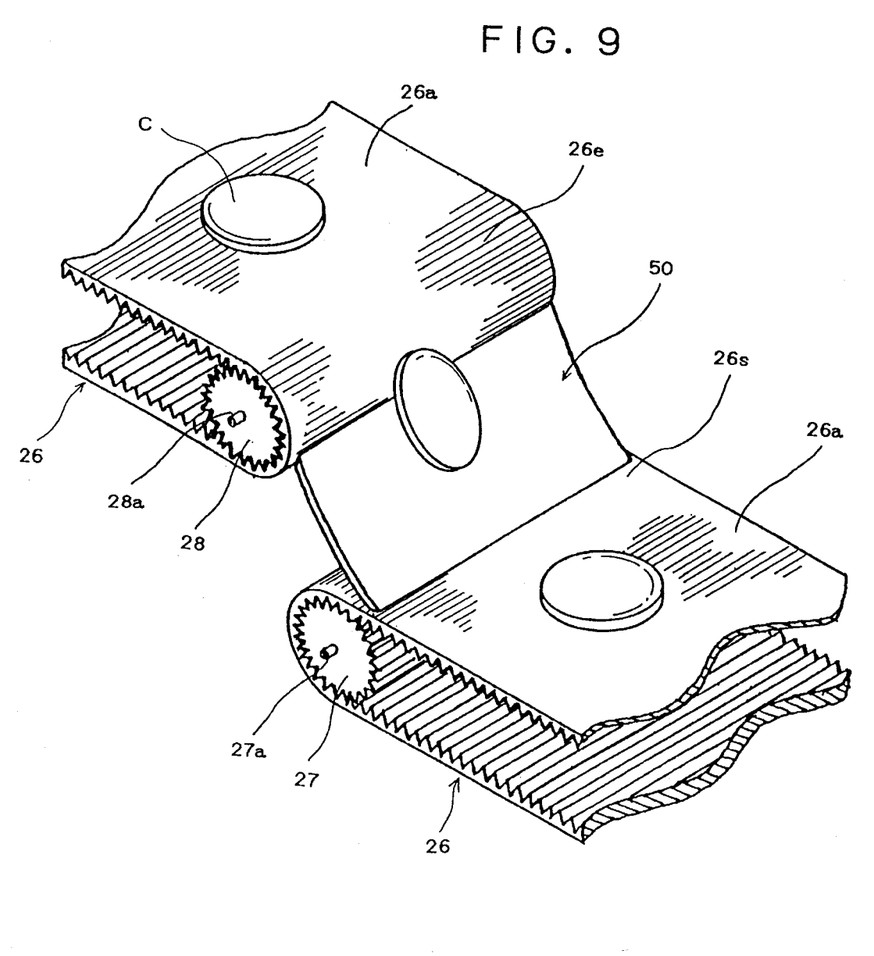
FIG. 9 is a perspective view of a coin conveying endless belt and a coin slide between the conveying units in the embodiment of the present invention.

On the other hand, when a plurality of conveying units 40 are placed onto the rows of pachinko machines as shown in FIG. 8 and 9, the position of an ending side 26e (the portion wound around the drive pulley 28) of the coin conveying endless belt 26 at a conveying unit 40 is higher than the starting side 26s (the portion wound around the driven pulley 27) of the coin conveying endless belt 26 at another adjacent conveying unit 40.

A coin slide 50 is provided between the ending side 26e of one coin conveying endless belt 26 and the starting side 26s of another coin conveying belt 26, so that the coins C which reach the ending side 26e of the coin conveying endless belt 26 after being conveyed by the coin conveying endless belt 26 of one of the conveying units 40 can slide down smoothly to the starting side 26s of the coin conveying belt 26 of another adjacent conveying unit 40. This coin slide 50 comprises a slide board 51 where coins C slide down, a supporting rod 52 which supports the slide board 51, and a fixing board 53 for fixing the supporting rod 52 to the upright board 19c of the conveying base 19. The slide board 51 is extended toward the tangent of the outer periphery at the ending side 26e of the coin conveying endless belt to let the coins be easily transferred from the ending side 26e of the coin conveying endless belt to the slide board 51. The coin slide 50 is fixed to the upright board 19c of the conveying base 19 by screws 54 passing through the fixing board 53. The coin slide 50 may be fixed near the driven pulley 27 instead of near the drive pulley The coin conveying apparatus of the present invention comprises a plurality of coin conveying units 40, 40, . . . and coin slides 50, 50, . . . provided therebetween.

The operation of the pachinko island of the present embodiment will now be explained.

When a bank note A is inserted from the bank note insertion slot 17, it is determined by the bank note distinction device 24 as to whether the inserted bank note A is real, counterfeit, etc. If the bank note A is determined to be real, the bank note distinction device 24 instructs the ball lending machine 14 to give out the number of pachinko balls corresponding to the money value of the bank note while supplying the banknote A to the bank note conveying device. The ball lending machine 14 dispenses a number of pachinko balls corresponding to the given instructions from a pachinko ball dispensing slot 14a (see FIG. 12 and FIG. 13).

From the bank note distinction device 24, the bank notes A are supplied within the bank note conveying path defined by the bank note conveying path forming member 3 of the bank note conveying device. The bank note A within the bank note conveying path has one of its two faces in contact with the conveying surface of the bank note conveying belt 1 and the opposite face in contact with the ball 2. The bank note A is conveyed with rotation of the bank note conveying belt 1 in a condition pinched between the ball 2 and the bank note conveying belt 1.

When the bank note A is conveyed, by one bank note conveying device of a conveying unit 40 provided for one unit composed by two pachinko machines 13, 13 and two ball lending machines 14, 14, to the end of the conveying unit 40, it is transferred to another bank note conveying device provided at a succeeding adjacent conveying unit 40, and finally to the moneychanger 15d within the island decoration 15a provided at the end of the pachinko island B.

When coins C are inserted from the coin insertion slots 18, the coin distinction device (not shown) distinguishes whether coins C inserted from the coin insertion slots 18 are real, counterfeit, etc. It conveys the coins C distinguished to be real to the coin conveying device and instructs the ball lending machine 14 to dispense the number of pachinko balls corresponding to the money amount of the coins c.

The coins C from the coin distinction device are then placed onto the coin placing section 26a of the coin conveying endless belt 26. Coins C placed on the coin conveying endless belt 26 are conveyed to the ending side 26e of the coin conveying endless belt 26 by the rotation of the coin conveying endless belt 26. Since a coin C is much heavier compared to a bank note A, the coin conveying endless belt 26, not being able to withstand the weight of the coins C, will become loose. The looseness will be substantial, especially between the drive pulley 28 and the driven pulley 27, and this may be a hindrance to coin conveyance. Thus, in the present embodiment, the coin placing section 26a of the coin conveying endless belt 26 is supported from the front starting side by the supporting board 33a of the belt supporting member 33. Further, in the present embodiment, the positions of the coins C in the widthwise direction of the coin conveying endless belt 26 are controlled by the side boards 33b, 33b of the belt supporting member 33 so that coins C may not fall out from the coin placing section 26a of the coin conveying endless belt 26 to the widthwise direction. Although what is called H sections are used as a belt supporting member in the present embodiment, the same kind of effect can be gained by using what is called channel sections to provide coin conveying endless belt at the bottom of the channel. If the function as a belt supporting member only considers supporting of the belt without controlling the positions of the coins C, a roller may be used to decrease frictional resistance with the belt 26.

When coins C reach the ending side 26e of the coin conveying endless belt 26, they smoothly slide down the slide board 51 of the coin slide 50 to the starting side 26s of the coin conveying endless belt 26 of another adjacent conveying unit 40. The coins C which have reached the startling side 26s of the coin conveying endless belt 26 are conveyed by other coin conveying endless belts 26, and will finally be conveyed to the moneychanger 15d in the island decoration 15a provided at the end of the pachinko island, similar to the bank notes A.

As stated above, in the present embodiment, the coin conveying endless belt 26 is slanted at the coin conveying direction to have the ending side 26e higher than the starting side 26s, and the coin slide 50 is placed between the ending side 26e of the coin conveying endless belt 26 and the starting side 26s of the adjacent coin conveying endless belt 26. Thus, the transfer of coins C from one coin conveying endless belt 26 to another coin conveying endless belt 26 is ensured.

Further, in the present embodiment, since a plurality of teeth are formed on the periphery of each of the pulleys 30a, 30b over which the transmitting belt is placed, and ribs are formed on the inner surface of the transmitting belt to fit the teeth of the each of the pulleys 30a, 30b, the rotating force of the coin conveying motor 30 can be transmitted to the drive pulley 28 without loss. It is important to prevent slip loss between the belt and the pulley when conveying bank notes. This is even more important when conveying coins which are heavier than bank notes.

Figure 10:
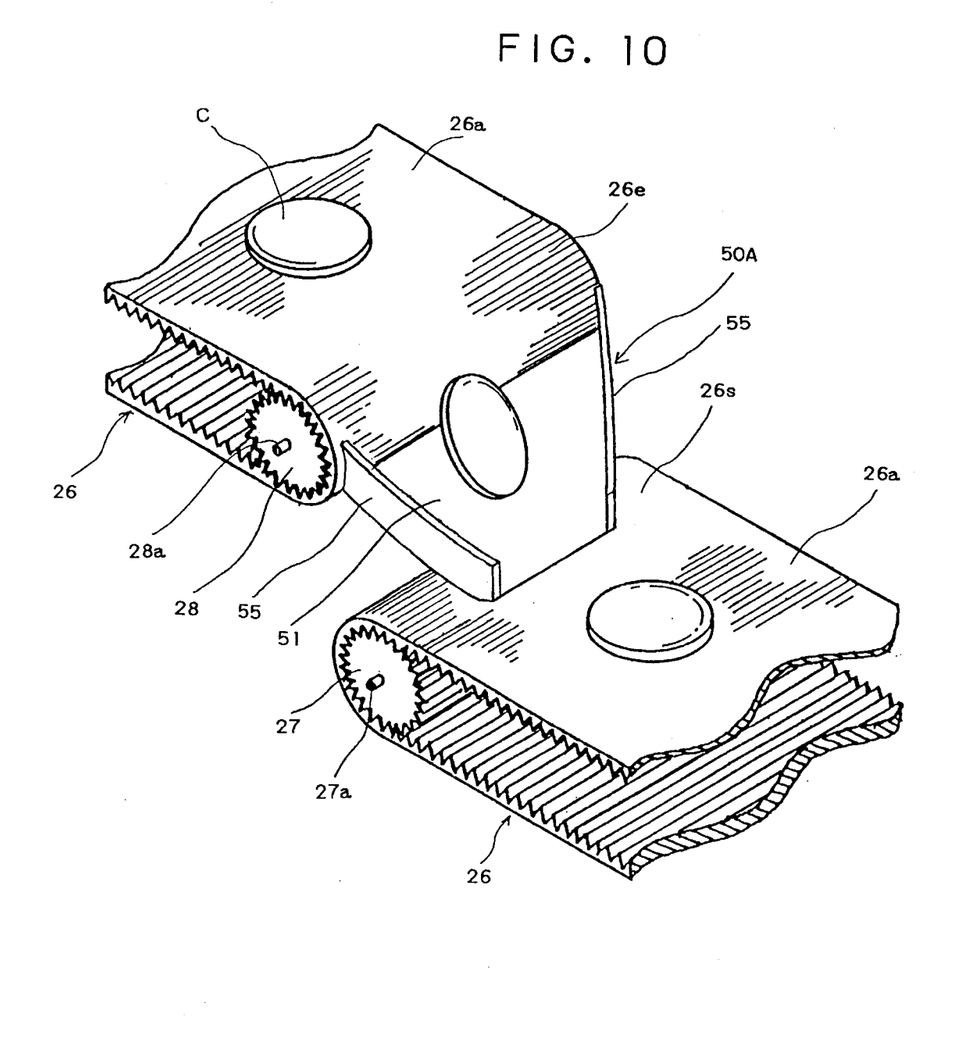
FIG. 10 is a similar perspective view of a coin conveying endless belt and a coin slide between the conveying units in another embodiment of the present invention.

Another embodiment of the coin slide will be explained below, with reference to FIG. 10.

A coin slide 50A of the present embodiment, having the same construction as the coin slide in the aforementioned embodiment, is provided with widthwise direction guide boards 55, 55, perpendicular to the direction of coin conveyance, that is the widthwise direction of the coin conveying endless belt 26, to restrict the position of the coins C. The widthwise direction guide boards 55, 55 are respectively provided at the end of the two sides of the slide 51, and the relative distance therebetween gets narrower, from the ending side 26e of one coin conveying endless belt to the starting side 26s of the coin conveying endless belt 26 of another adjacent conveying unit 40 and toward the center of the widthwise direction of the coin conveying belt of another conveying unit 40.

Accordingly, by providing widthwise direction guide boards 55, 55, the coins C which have slid down from the ending side 26e of one coin conveying endless belt 26 to the starting side 26s of the coin conveying endless belt 26 of another adjacent conveying unit 40 will be positioned almost at the center, in the widthwise direction, of the coin conveying endless belt 26. Thus, the transfer of the coins C from one coin conveying endless belt 26 to another coin conveying endless belt 26 can be carried out more accurately.

What is claimed is:

1. A coin conveying apparatus for conveying coins comprising a plurality of conveying units, each including an endless belt having a flat peripheral surface, a drive pulley and a driven pulley over which said endless belt is placed, a shaft for each pulley, a pulley driving mechanism to rotate said shaft of said drive pulley, and a conveying base upon which the above mentioned parts are mounted, wherein:

said shaft of said driven pulley is rotatably fixed to said conveying base to extend parallel to a horizontal direction;

said shaft of said drive pulley is rotatably fixed to said conveying base to extend parallel to a horizontal direction, at a higher position than said shaft of said driven pulley to allow said endless belt to ascend gradually from a driven pulley end to a drive pulley end;

said pulley driving mechanism rotates said shaft of said drive pulley so that a portion of said flat peripheral surface of said endless belt positioned at an upper side of said endless belt, and on which the coins are placed, moves toward said drive pulley from said driven pulley; and said plurality of conveying units are arranged next to each other so that said drive pulley end of one conveying unit is adjacent to said driven pulley end of another conveying unit;

said coin conveying apparatus further comprising a coin slide which allows coins that have reached the drive pulley end of said one conveying unit to slide onto said coin conveying endless belt of said another conveying unit at the driven pulley end thereof.

2. A coin conveying apparatus as defined in claim 1, wherein said driven pulley and said drive pulley of each of said conveying units are formed to be cylindrical, each having its respective shaft at the center, with a plurality of teeth formed at the peripheral surface of the respective pulley, and wherein an inner surface of said endless belt is formed with ribs to fit the teeth of said drive pulley and said driven pulley.

3. A coin conveying apparatus as defined in claim 1, wherein at least one of said conveying unit is provided with a belt supporting member which supports said portion of said endless belt from below between said driven pulley and said drive pulley.

4. A coin conveying apparatus as defined in claim 3, wherein said belt supporting member comprises a supporting board which supports said portion of said endless belt by coming into contact with a bottom surface of said portion and side boards along each side of said portion which restrict the position, in a widthwise direction perpendicular to the moving direction of said portion of said endless belt, of coins placed on said portion of said endless belt.

5. A coin conveying apparatus for conveying coins comprising a plurality of conveying units, each including an endless belt having a flat peripheral surface, a drive pulley and a driven pulley over which said endless belt is placed, a shaft for each pulley, a pulley driving mechanism to rotate said shaft of said drive pulley, and a conveying base upon which the above mentioned parts are mounted, wherein:

said shaft of said driven pulley is rotatably fixed to said conveying base to extend parallel to a horizontal direction;

said shaft of said drive pulley is rotatably fixed to said conveying base to extend parallel to a horizontal direction, at a higher position than said shaft of said driven pulley to allow said endless belt to ascend gradually from a driven pulley end to a drive pulley end;

said pulley driving mechanism rotates said shaft of said drive pulley so that a portion of said flat peripheral surface of said endless belt positioned at an upper side of said endless belt, and on which the coins are placed, moves toward said drive pulley from said driven pulley; and said plurality of conveying units are arranged next to each other so that said drive pulley end of one conveying unit is adjacent to said driven pulley end of another conveying unit;

said coin conveying apparatus further comprising a coin slide which allows coins that have reached the drive pulley end of said one conveying unit to slide onto said coin conveying endless belt of said another conveying unit at the driven pulley end thereof, said coin slide comprising a guide member which introduces said coins toward the center of the widthwise direction of said portion of said endless belt of said another conveying unit, as said coins slide down from said endless belt of one conveying unit to said endless belt of said another conveying unit adjacent to said one conveying unit, the widthwise direction being perpendicular to the moving direction of said portion of said endless belt of said another conveying unit.

6. A coin conveying apparatus as defined in claim 5, wherein said driven pulley and said drive pulley of each of said conveying units are formed to be cylindrical, each having its respective shaft at the center with a plurality of teeth formed at the peripheral surface of the respective pulley, and wherein an inner surface of said endless belt is formed with ribs to fit the teeth of said drive pulley and said driven pulley.

7. A coin conveying apparatus as defined in claim 5, wherein at least one of said conveying units is provided with a belt supporting member which supports said portion of said endless belt from below between said driven pulley and said drive pulley.

8. A coin conveying apparatus as defined in claim 7, wherein said belt supporting member comprises a supporting board which supports said portion of said endless belt by coming into contact with a bottom surface of said portion and side boards along each side of said portion which restrict the position, in the widthwise direction, of coins placed on said portion of said endless belt.

* * * * *